(12) United States Patent
Saruwatari et al.

(10) Patent No.: US 9,296,457 B2
(45) Date of Patent: Mar. 29, 2016

(54) OUTBOARD MOTOR

(71) Applicant: YAMAHA HATSUDOKI KABUSHIKI KAISHA, Iwata-shi, Shizuoka (JP)

(72) Inventors: Kimitaka Saruwatari, Shizuoka (JP); Kouichi Isozaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/730,376

(22) Filed: Jun. 4, 2015

(65) Prior Publication Data

US 2016/0001866 A1    Jan. 7, 2016

(30) Foreign Application Priority Data

Jul. 1, 2014 (JP) ................. 2014-135661

(51) Int. Cl.
| | |
|---|---|
| *B63H 20/32* | (2006.01) |
| *B63H 21/36* | (2006.01) |
| *B63H 20/14* | (2006.01) |
| *F01M 1/02* | (2006.01) |
| *B63H 20/06* | (2006.01) |
| *F16J 15/08* | (2006.01) |
| *F16J 15/14* | (2006.01) |
| *F02B 61/04* | (2006.01) |

(52) U.S. Cl.
CPC ............... *B63H 20/14* (2013.01); *B63H 20/06* (2013.01); *F01M 1/02* (2013.01); *F16J 15/0818* (2013.01); *F16J 15/14* (2013.01); *F01M 2001/0292* (2013.01); *F02B 61/045* (2013.01)

(58) Field of Classification Search
CPC ........ B63H 20/00; B63H 20/02; B63H 20/06; B63H 20/14; B63H 20/32; B63H 2020/02; B63H 2020/025; B63H 2020/14; B63H 2020/32; F02B 61/045; F02M 61/02; F01M 2001/0292
USPC ............................................. 440/76
See application file for complete search history.

(56) References Cited

U.S. PATENT DOCUMENTS

| | | | | |
|---|---|---|---|---|
| 2,676,559 A | * | 4/1954 | Davies ................ | B63H 20/10 123/195 P |
| 4,802,871 A | * | 2/1989 | Watanabe ............ | B63H 20/002 440/75 |
| 7,798,874 B2 | | 9/2010 | Fukuoka | |
| 8,246,402 B2 | * | 8/2012 | Okabe ................ | B63H 23/08 440/75 |
| 2009/0047847 A1 | * | 2/2009 | Gruenwald ............ | B63B 1/16 440/75 |
| 2015/0133009 A1 | * | 5/2015 | Saruwatari ............ | B63H 20/28 440/88 P |

FOREIGN PATENT DOCUMENTS

| | | |
|---|---|---|
| JP | 2001-303920 A | 10/2001 |
| JP | 2009-160970 A | 7/2009 |

* cited by examiner

*Primary Examiner* — Daniel V Venne
(74) *Attorney, Agent, or Firm* — Keating and Bennett, LLP (57) ABSTRACT

An outboard motor includes an engine including a cylinder body and a crank case, an engine holder configured to come into contact with both the cylinder body and the crank case along a second bonding surface, a power transmission shaft passing through a hole between the engine holder and both the cylinder body and the crank case, and a first sealing member between a portion of the power transmission shaft above the second bonding surface and above both the cylinder body and the crank case to separate an oil region above the first sealing member from an external water entering region below the first sealing member.

14 Claims, 5 Drawing Sheets

SECTIONAL VIEW TAKEN ALONG LINE 910-910 AS VIEWED FROM ABOVE

*FIG.5*  DIAGRAM OF SECOND BONDING SURFACE 520 AS VIEWED FROM BELOW

*FIG.6*  DIAGRAM OF SECOND BONDING SURFACE 520 AS VIEWED FROM ABOVE

OUTBOARD MOTOR

CROSS-REFERENCE TO RELATED APPLICATION

This application claims priority to Japanese Patent Application Number JP 2014-135661, filed on Jul. 1, 2014, the entire contents of which are hereby incorporated by reference.

BACKGROUND OF THE INVENTION

1. Field of the Invention

The present invention relates to an outboard motor, and more particularly, it relates to an outboard motor including an engine and an engine holder.

2. Description of the Related Art

An outboard motor including an engine and an engine holder is known in general. Such an outboard motor is disclosed in Japanese Patent Laid-Open No. 2001-303920, for example.

Japanese Patent Laid-Open No. 2001-303920 discloses an outboard motor including an engine and an engine holder including an upper surface to which the engine is fixed. This engine includes a crank case including a crank shaft. Conceivably, this engine is arranged adjacent to the crank case in a horizontal direction and includes a cylinder body including a cylinder. In the case where the engine including the cylinder body and the crank case is bonded onto the engine holder, a three-surface bonding portion where boundary surfaces between the cylinder body, the crank case, and the engine holder intersect with each other is generated. The crank shaft is conceivably arranged substantially adjacent to the three-surface bonding portion.

In the outboard motor described in Japanese Patent Laid-Open No. 2001-303920, however, a very small clearance easily remains in the three-surface bonding portion where the boundary surfaces between the cylinder body, the crank case, and the engine holder intersect with each other even in the case where the boundary surfaces are sealed by gaskets. In the outboard motor described in Japanese Patent Laid-Open No. 2001-303920, an inner portion of the three-surface bonding portion is water resistant (seawater resistant) due to a supply of lubrication oil thereto, but an oil supply path is located in the three-surface bonding portion such that oil may leak. In the case where no oil is supplied to the three-surface bonding portion, on the other hand, components arranged in the cylinder body and the crank case are exposed to external water, and hence water resistant (seawater resistant) surface treatment must be performed on the components arranged in the cylinder body and the crank case.

SUMMARY OF THE INVENTION

Preferred embodiments of the present invention have been proposed in order to solve the above problems, and preferred embodiments of the present invention provide an outboard motor that prevents exposure of inner portions of a cylinder body and a crank case to external water.

An outboard motor according to a preferred embodiment of the present invention includes an engine including a cylinder body and a crank case arranged adjacent to the cylinder body in a horizontal direction and bonded to the cylinder body along a first bonding surface, an engine holder configured to come into contact with both the cylinder body and the crank case along a second bonding surface and including an upper surface to which the engine is fixed, a power transmission shaft including a crank shaft rotatably supported between the cylinder body and the crank case and a drive shaft coupled to the crank shaft, and arranged to pass through a hole between the cylinder body, the crank case, and the engine holder in a direction intersecting with the second bonding surface, and a first sealing member arranged between a portion of the power transmission shaft above the second bonding surface and above both the cylinder body and the crank case and configured to separate an oil region above the first sealing member from an external water entering region below the first sealing member.

As described above, the outboard motor is provided with the first sealing member arranged between the portion of the power transmission shaft above the second bonding surface and above both the cylinder body and the crank case and configured to separate the oil region above the first sealing member from the external water entering region below the first sealing member. Thus, even in the case where external water entering from between the engine holder and the crank case enters a portion (in the hole) where the crank shaft is arranged through a three-surface bonding portion, the first sealing member prevents exposure of inner portions of the cylinder body and the crank case to external water (entry of external water into oil regions of the cylinder body and the crank case). Consequently, the number of components requiring surface treatment arranged in the cylinder body and the crank case is reduced. Therefore, the number of components requiring water resistant surface treatment is reduced while exposure of the inner portions of the cylinder body and the crank case to external water is reduced or prevented.

In this description, the "external water" refers to seawater of the sea or freshwater of a river or lake on which a boat body mounted with the outboard motor sails.

The outboard motor according to a preferred embodiment of the present invention preferably further includes a second sealing member arranged between a portion of the power transmission shaft below the second bonding surface and the engine holder. According to this structure, the second sealing member prevents entry of external water from the external water entering region above the second sealing member into the region below the second sealing member. Thus, even in the case where external water entering from between the engine holder and the crank case enters the portion where the crank shaft is arranged through the three-surface bonding portion, the second sealing member prevents the external water from reaching the region below the second sealing member. Consequently, the number of components requiring surface treatment coupled to the power transmission shaft in the region below the second sealing member is reduced. Thereafter, the number of components requiring water resistant surface treatment is further reduced while exposure of the components coupled to the power transmission shaft in the region below the second sealing member to external water is prevented.

In this case, a portion between the first sealing member and the second sealing member is preferably the external water entering region that external water enters, and no external water preferably enters a portion of the power transmission shaft above the first sealing member or a portion of the power transmission shaft below the second sealing member. According to this structure, entry of external water entering the portion between the first sealing member and the second sealing member into the portion where the power transmission shaft is located is prevented. Furthermore, water resistant surface treatment is performed only on the portion held between the first sealing member and the second sealing member, and hence the number of components requiring water resistant surface treatment is further reduced.

In the above structure including the second sealing member, the first sealing member and the second sealing member are preferably arranged at an outer peripheral portion of a lower portion of the crank shaft. According to this structure, entry of external water into an upper portion of the crank shaft is prevented. Consequently, surface treatment on the upper portion of the crank shaft is not required, or water resistant surface treatment on a larger number of components is not required.

In the above structure including the second sealing member, the first sealing member and the second sealing member are preferably ring-shaped sealing members. According to this structure, the first sealing member and the second sealing member adhere tightly to the complete periphery of an outer peripheral portion of the power transmission shaft. Consequently, entry of external water entering the portion held between the first sealing member and the second sealing member into the portion above the first sealing member and the portion below the second sealing member is more reliably prevented.

In the above structure in which the first sealing member and the second sealing member are preferably ring-shaped sealing members, the first sealing member and the second sealing member are preferably ring-shaped oil seals. According to this structure, the first sealing member and the second sealing member have a high sealing performance.

In the above structure in which the first sealing member and the second sealing member are preferably ring-shaped sealing members, the first sealing member and the second sealing member are preferably opposed to each other in a vertical direction. According to this structure, the first sealing member and the second sealing member are arranged close to each other. Therefore, the external water entering region between the first sealing member and the second sealing member is reduced in size. Consequently, the first sealing member and the second sealing member are prevented from being moved and displaced from the their positions.

In the above structure in which the first sealing member and the second sealing member are preferably ring-shaped sealing members, the crank case and the cylinder body preferably include an annular first storage portion accommodating the first sealing member. According to this structure, the first sealing member is securely accommodated (held) at a prescribed position by the first storage portion.

In the above structure including the first storage portion, the engine holder preferably includes an annular second storage portion provided below the first storage portion accommodating the second sealing member. According to this structure, the second sealing member is securely accommodated (held) at a position below the first sealing member by the second storage portion.

The above structure including the second sealing member preferably further includes an oil pump that circulates oil to the engine and a third sealing member located below the second sealing member, configured to separate an oil region above the third sealing member, and provided between the third sealing member and the second sealing member and an external water entering region below the third sealing member, and the oil pump is preferably located in the oil region between the second sealing member and the third sealing member. According to this structure, the second sealing member prevents entry of external water into the portion below the second sealing member while the third sealing member prevents entry of external water into the portion above the third sealing member, such that the region between the second sealing member and the third sealing member reliably defines an oil region, and the oil pump is located in the oil region. Consequently, the degree of freedom of the layout of a lubricating system is improved.

In the above outboard motor, a first gasket is preferably located on the first bonding surface between the cylinder body and the crank case. According to this structure, entry of external water into the hole through the first bonding surface is prevented by the first gasket.

In the above outboard motor, a second gasket is preferably located on the second bonding surface between the engine holder and both the crank case and the cylinder body. According to this structure, entry of external water into the region of the power transmission shaft through the second bonding surface is prevented by the second gasket.

In the above outboard motor, the crank shaft and the drive shaft are preferably coaxial with each other. According to this structure, the shape of the power transmission shaft (the crank shaft and the drive shaft) is prevented from being complicated unlike the case where the crank shaft and the drive shaft are arranged on rotation central axis lines different from each other. Consequently, the hole (the cylinder body, the crank case) where the power transmission shaft is located is easily sealed.

In the above outboard motor, a rotation central axis line of the drive shaft preferably extends along an extension surface of the first bonding surface. According to this structure, peripheral wall portions defining the hole into which the power transmission shaft is inserted is divided in half into the cylinder body and the crank case. Consequently, the first bonding surface of the hole (the cylinder body, the crank case) where the power transmission shaft is located is easily sealed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter described with reference to the drawings.

The structure of an outboard motor 1 according to preferred embodiments of the present invention is now described with reference to FIGS. 1 to 6. In the figures, arrow FWD represents the forward movement direction of a boat body 100, and arrow BWD represents the reverse movement direction of the boat body 100.

Figure 1:
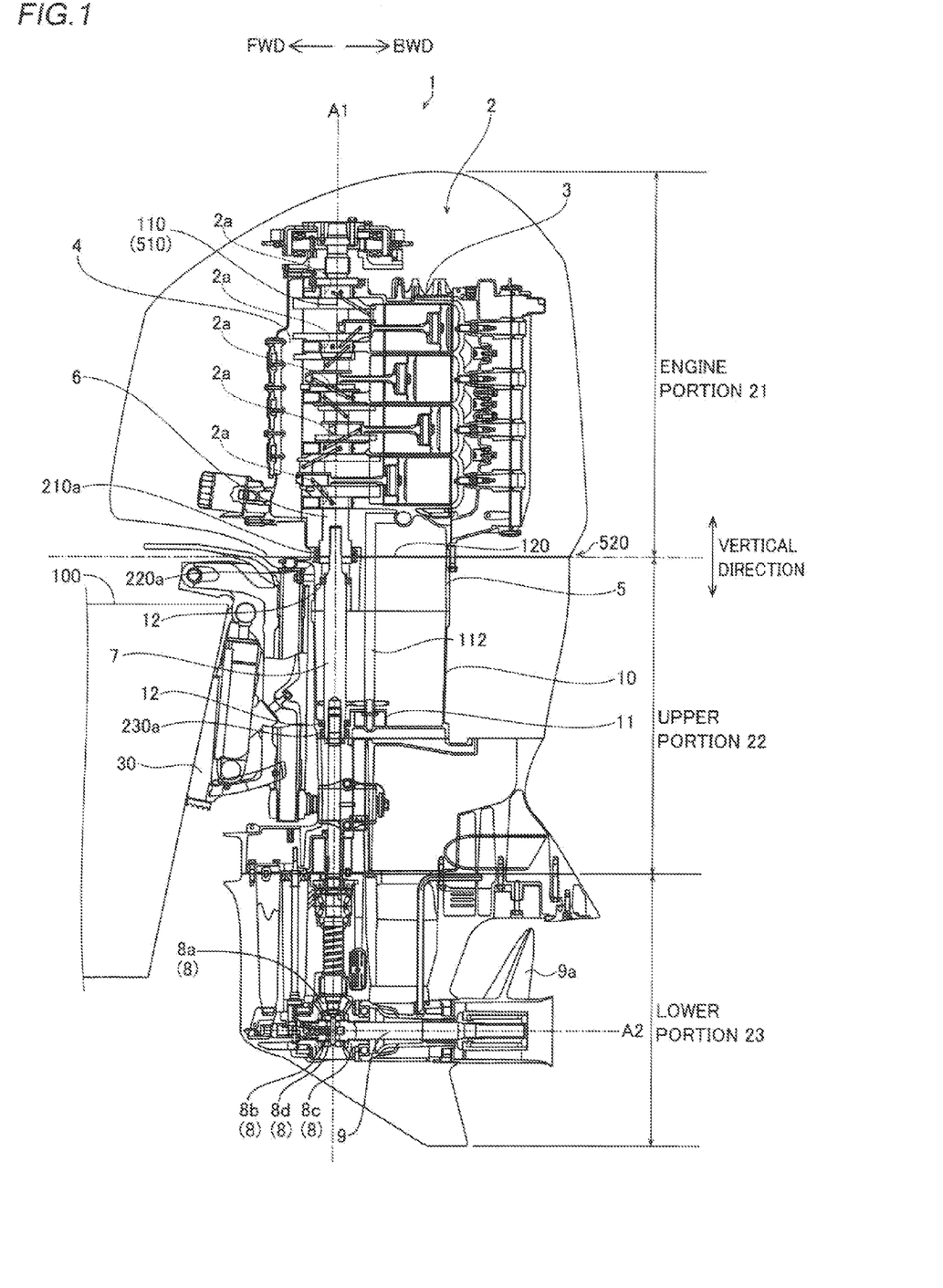
FIG. 1 is a diagram illustrating the overall structure of an outboard motor according to a preferred embodiment of the present invention.

The outboard motor 1 includes an engine 2, as shown in FIG. 1. The engine 2 includes a cylinder body 3 and a crank case 4. The outboard motor 1 includes an engine holder 5, a crank shaft 6, a drive shaft 7, a gear portion 8, and a propeller shaft 9. The outboard motor 1 includes an oil pan 10 and an oil pump 11. The outboard motor 1 includes a first sealing member 210a, a second sealing member 220a, and a third sealing member 230a to seal prescribed portions of the outboard motor 1. In the outboard motor 1, a region between the first sealing member 210a and the second sealing member 220a and a region below the third sealing member 230a are external water entering regions (regions that external water enters; see FIG. 3) that external water enters. In the outboard motor 1, a region above the first sealing member 210a and a region between the second sealing member 220a and the third sealing member 230a are oil regions (regions that no external water enters; see FIG. 3).

The outboard motor 1 includes an engine portion 21, an upper portion 22, and a lower portion 23 from the top. The outboard motor 1 is coupled to the boat body 100 through a bracket 30. The crank shaft 6 and the drive shaft 7 are examples of the "power transmission shaft" according to a preferred embodiment of the present invention. The crank case 4 is bonded to the cylinder body 3, and this bonding surface is called a first bonding surface 510. The engine holder 5 is bonded to both the cylinder body 3 and the crank case 4, and a bonding surface between both the cylinder body 3 and the crank case 4 and the engine holder 5 is called a second bonding surface 520.

Figure 2:
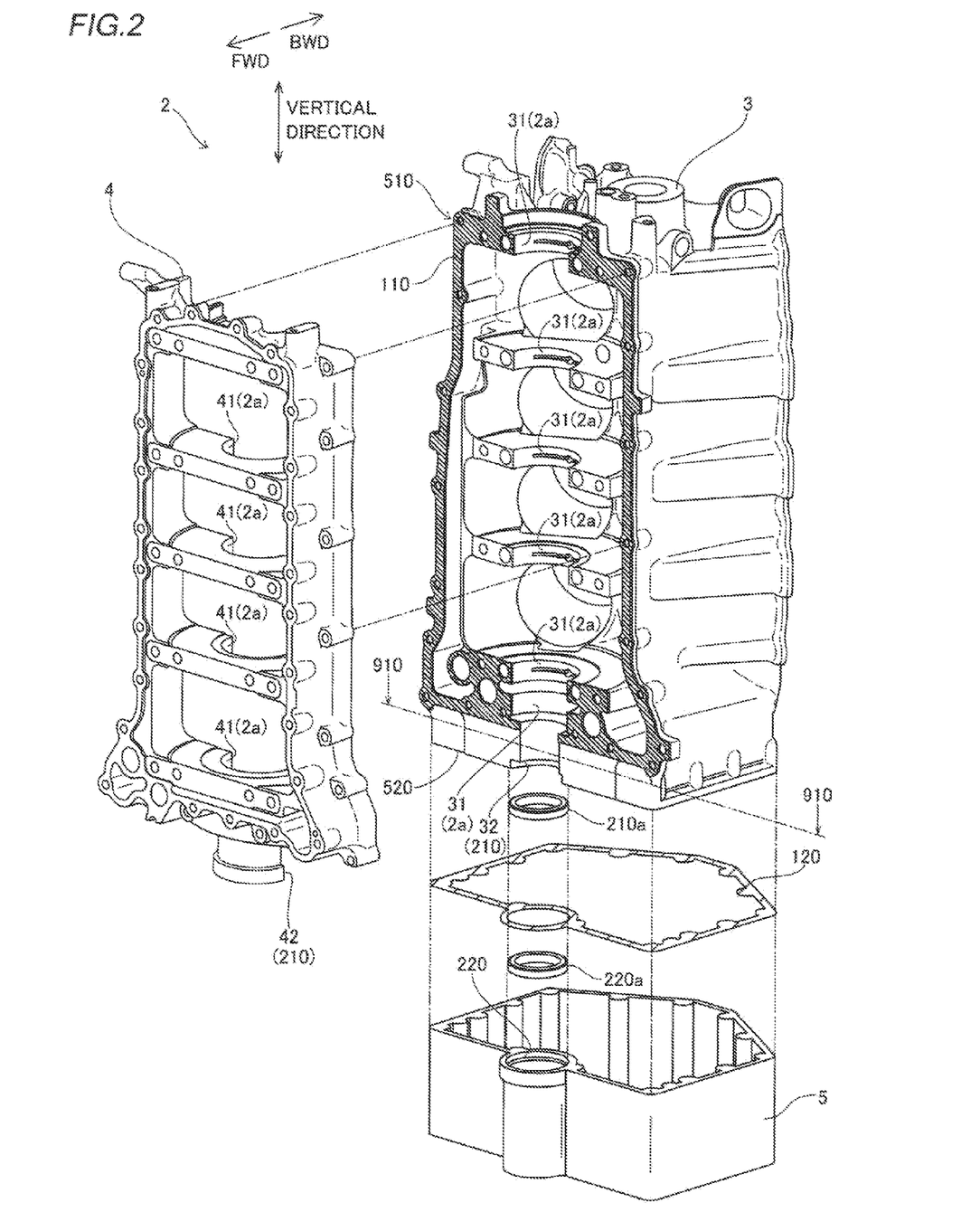
FIG. 2 is an exploded perspective view showing a cylinder body, a crank case, and an engine holder of the outboard motor according to a preferred embodiment of the present invention.

As shown in FIG. 2, the cylinder body 3 includes a plurality of notches 31 to accommodate the crank shaft 6 (see FIG. 1) and a notch 32 to accommodate the first sealing member 210a.

The notches 31 preferably each have an arcuate inner peripheral surface in a plan view.

The notch 32 includes an arcuate inner peripheral surface in the plan view. The notch 32 is provided below the plurality of notches 31. Specifically, the notch 32 is provided in a lower end of the cylinder body 3.

The crank case 4 is arranged adjacent to the cylinder body 3 in a horizontal direction (forward). The crank case 4 is bonded to the cylinder body 3 through a first gasket 110 on the first bonding surface 510. The first gasket 110 is a liquid gasket preferably made of a flowable hardening resin primarily containing silicone or synthetic rubber, for example. In FIG. 2, the first gasket 110 is shown in hatched lines. The crank case 4 includes a plurality of notches 41 to accommodate the crank shaft 6 and a notch 42 to accommodate the first sealing member 210a.

The notches 41 preferably each have an arcuate inner peripheral surface in the plan view. Holes 2a are defined by the notches 41 of the crank case 4 and the notches 31 of the cylinder body 3 between the crank case 4 and the cylinder body 3. The holes 2a preferably have a circular or substantially circular shape in the plan view. The crank shaft 6 (see FIG. 1) is arranged in the holes 2a.

The notch 42 preferably has an arcuate inner peripheral surface in the plan view. The notch 42 is provided below the plurality of notches 41. Specifically, the notch 42 is provided in a lower end of the crank case 4. An annular (circular or substantially circular) first storage portion 210 is defined by the notch 42 of the crank case 4 and the notch 32 of the cylinder body 3. The centers of the holes 2a and the center of the first storage portion 210 are preferably coaxial. The centers of the holes 2a and the center of the first storage portion 210 are arranged on a rotation central axis line A1 of the crank shaft 6 shown in FIG. 1.

Figure 3:
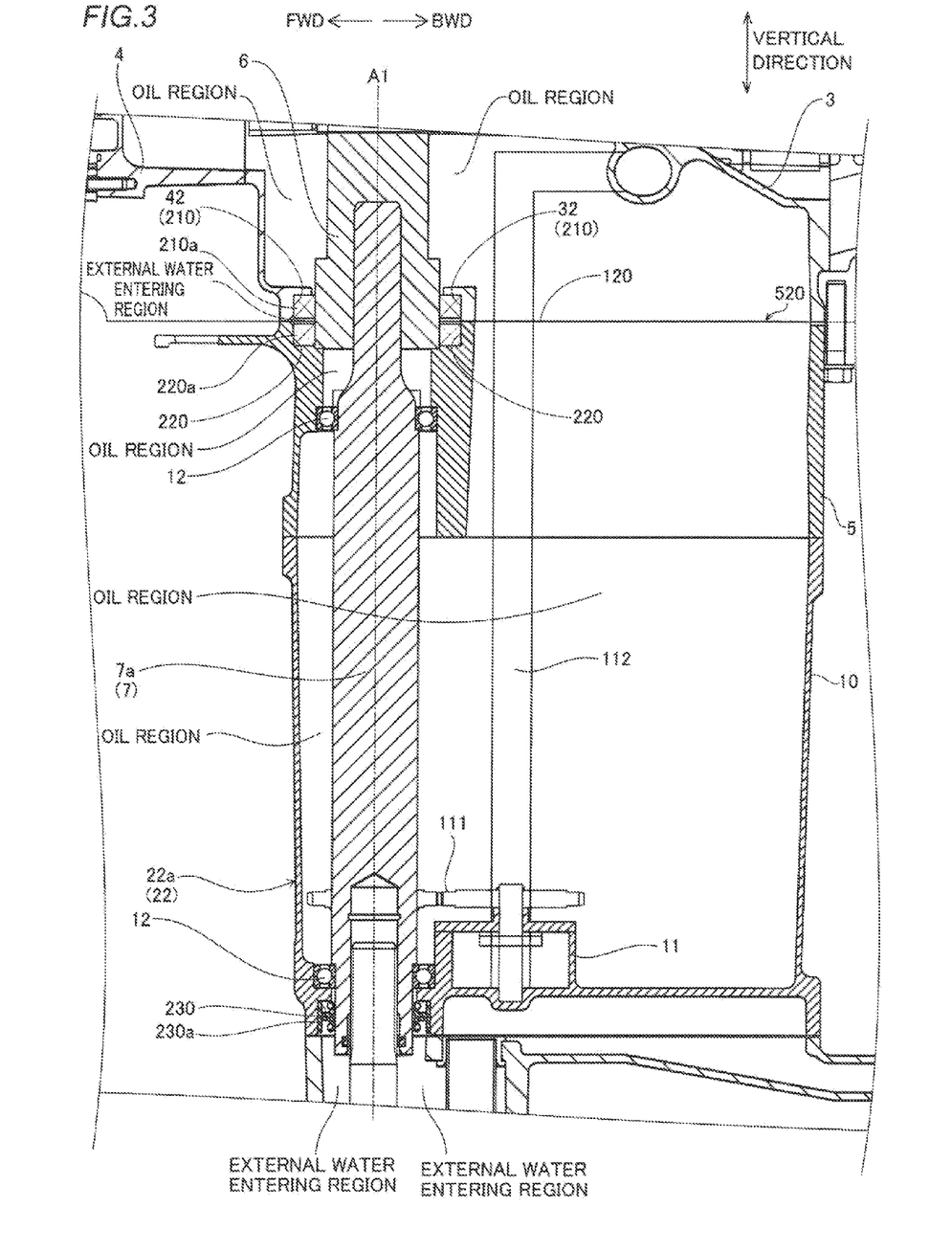
FIG. 3 is an enlarged sectional view showing a portion of the outboard motor according to a preferred embodiment of the present invention where a first sealing member, a second sealing member, and a third sealing member are provided.
Figure 5:
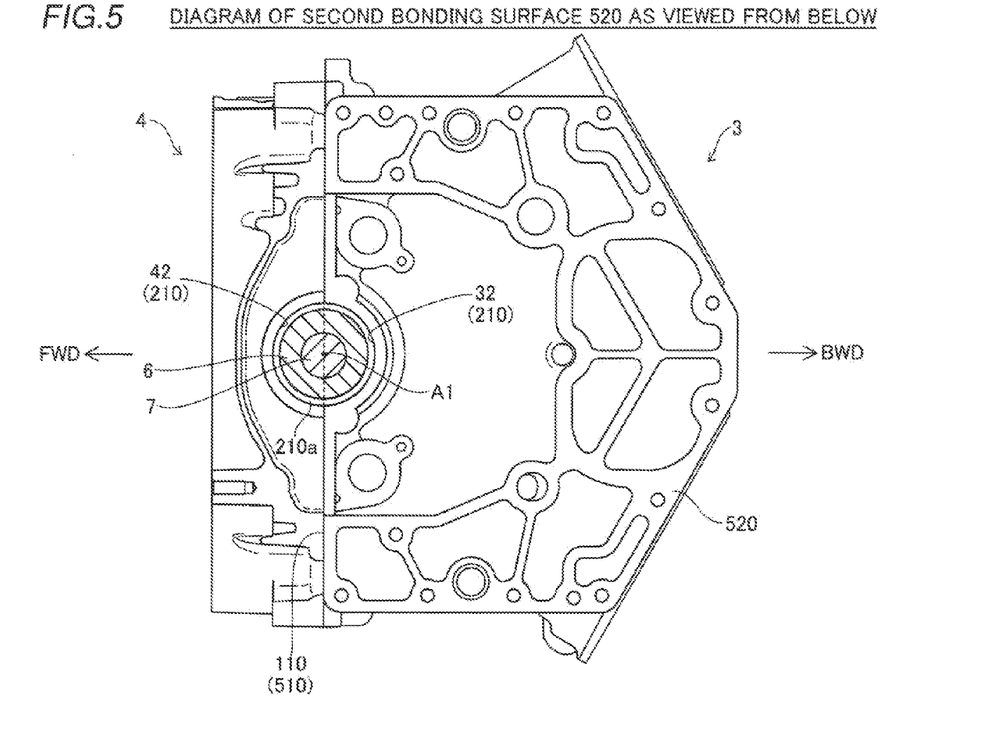
FIG. 5 is a diagram of a second bonding surface of the outboard motor according to a preferred embodiment of the present invention, as viewed from below.

As shown in FIG. 3, the first sealing member 210a is stored in (pressed into) the first storage portion 210. The first sealing member 210a is preferably a ring-shaped (see FIG. 2) oil seal. The first sealing member 210a is located between portions of the crank shaft 6 and the drive shaft 7 above the second bonding surface 520 and above both the cylinder body 3 and the crank case 4. The first sealing member 210a is located in an outer peripheral portion of a lower portion (in the vicinity of a lower end) of the crank shaft 6. The first sealing member 210a is configured to adhere tightly (see FIG. 5) to the outer peripheral portion of the crank shaft 6. In FIG. 3, the bracket 30 is omitted for the convenience of illustration. In FIG. 5, for the convenience of illustration, a second gasket 120 described below is omitted, and the crank shaft 6 and the drive shaft 7 are included.

As shown in FIG. 2, the engine holder 5 is located below the engine 2 (the cylinder body 3 and the crank case 4). The engine holder 5 includes an upper surface to which the engine 2 is fixed. The engine holder 5 is preferably a frame-shaped member including a hole passing therethrough in the vertical direction. The engine holder 5 is bonded to the cylinder body 3 and the crank case 4 through the second gasket 120 on the second bonding surface 520. The second gasket 120 is preferably a metal gasket made of metal such as copper or stainless steel, for example. In FIG. 2, the second gasket 120 is shown in hatched lines.

Figure 6:
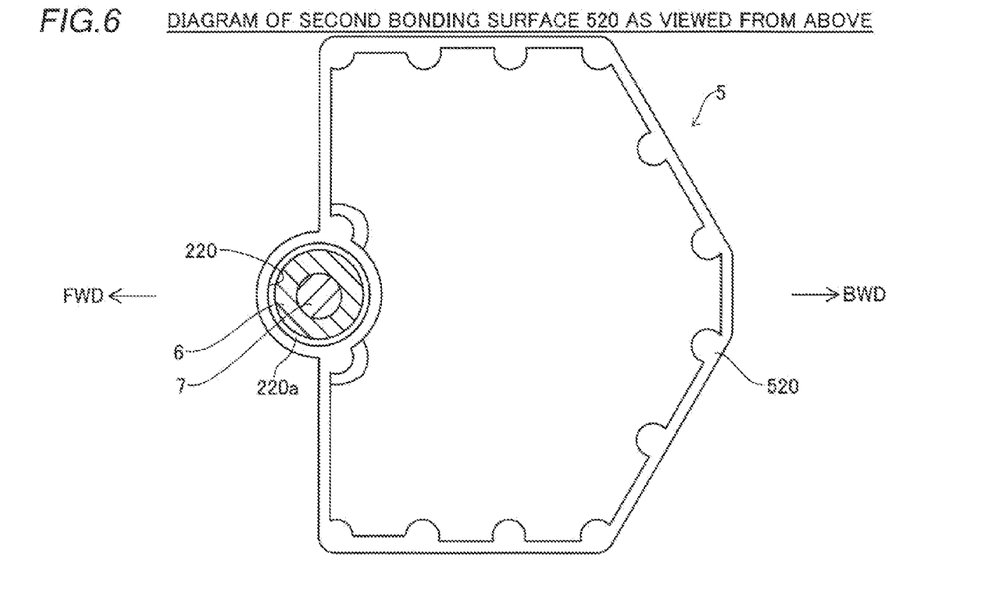
FIG. 6 is a diagram of the second bonding surface of the outboard motor according to a preferred embodiment of the present invention, as viewed from above.

The engine holder 5 includes a second storage portion 220 accommodating the second sealing member 220a. The second storage portion 220 includes an annular (circular or substantially circular) inner peripheral surface. The second storage portion 220 is provided below the first storage portion 210 and connects to the first storage portion 210. Thus, the first storage portion 210 and the second storage portion 220 define a concave storage portion as a whole. The second storage portion 220 is provided in an upper end of the engine holder 5. As shown in FIG. 3, the second sealing member 220a is stored in (pressed into) the second storage portion 220. The second sealing member 220a is preferably a ring-shaped (see FIG. 2) oil seal. The second sealing member 220a is located between portions of the crank shaft 6 and the drive shaft 7 and below the second bonding surface 520 and the engine holder 5. The second sealing member 220a is located in the outer peripheral portion of the lower portion (in the vicinity of the lower end) of the crank shaft 6. The second sealing member 220a adheres tightly (see FIG. 6) to the outer peripheral portion of the crank shaft 6. The second sealing member 220a is located adjacent to the first sealing member 210a and opposed to the first sealing member 210a in the vertical direction. The second sealing member 220a preferably has substantially the same shape as that of the first sealing member 210a. In FIG. 6, for the convenience of illustration, the second gasket 120 is omitted, and the crank shaft 6 and the drive shaft 7 are included.

As shown in FIG. 1, the crank shaft 6 is configured to rotate about the rotation central axis line A1 (hereinafter referred to as the axis line A1) extending in the vertical direction. The crank shaft 6 is arranged to pass through the holes 2a in a direction (vertical direction) orthogonal or substantially orthogonal to the second bonding surface 520. The crank shaft 6 is connected to an upper end of the drive shaft 7. The crank shaft 6 is rotatably supported between the cylinder body 3 and the crank case 4.

The drive shaft 7 is supported by bearings 12 located between the third sealing member 230a and the second sealing member 220a to be rotatable about the axis line A1. The axis line A1 of the drive shaft 7 extends along an extension surface (see FIG. 5) of the first bonding surface 510. The drive shaft 7 is coaxial with the crank shaft 6. The drive shaft 7 is arranged to pass through the engine holder 5 in the vertical direction and intersect with the second bonding surface 520. The driving force of the engine 2 is transmitted to the drive shaft 7 through the crank shaft 6. Thus, the drive shaft 7 rotates about the axis line A1 coaxially with the crank shaft 6.

The gear portion 8 includes a pinion gear 8a, a forward movement bevel gear 8b, and a reverse movement bevel gear 8c. The pinion gear 8a is mounted on a lower end of the drive shaft 7. The forward movement bevel gear 8b and the reverse movement bevel gear 8c are provided on the propeller shaft 9 to hold the pinion gear 8a therebetween. The gear portion 8 switches between engagement of a dog clutch 8d rotating integrally with the propeller shaft 9 with the forward movement bevel gear 8b and engagement of the dog clutch 8d with the reverse movement bevel gear 8c thus switching the rotation direction of the propeller shaft 9.

The propeller shaft 9 extends in an anteroposterior direction orthogonal or substantially orthogonal to the drive shaft 7. A rear end of the propeller shaft 9 is mounted with a propeller 9a. The propeller shaft 9 rotates about a rotation central axis line A2.

The oil pan 10 is arranged below the engine holder 5. As shown in FIG. 3, the oil pan 10 is included in the upper portion 22. Specifically, the oil pan 10 partially defines a case portion 22a of the upper portion 22. The oil pan 10 includes an opening on the upper side and is a container including a bottom portion. The oil pan 10 collects oil dropping from the engine 2. In other words, an inner portion of the oil pan 10 is an oil region. An oil pan penetration portion 7a of the drive shaft 7, excluding an upper end and a lower portion, penetrates through the oil pan 10 in the vertical direction. A third storage portion 230 accommodating the third sealing member 230a is provided in a lower end of the oil pan 10 through which the drive shaft 7 penetrates.

The oil pump 11 is provided in the upper portion 22. Specifically, the oil pump 11 is arranged in a region (oil region) between the second sealing member 220a and the third sealing member 230a and where no external water enters. More specifically, the oil pump 11 is located in the vicinity of an inner bottom portion of the oil pan 10. The oil pump 11 is connected to the drive shaft 7 through a power transmission portion 111 to drive the oil pump 11 following rotation of the drive shaft 7. The power transmission portion 111 includes a not shown gear member etc. The oil pump 11 circulates (supplies) oil to the engine 2 etc. through an oil flow path 112.

The third sealing member 230a is preferably a ring-shaped oil seal. The third sealing member 230a is located below the second sealing member 220a. In other words, the third sealing member 230a is provided at a height (see FIG. 1) corresponding to a central or substantially central portion of the upper portion 22 in the vertical direction. The oil pump 11 is arranged at a position closer to the third sealing member 230a than to the second sealing member 220a. More specifically, the third sealing member 230a is arranged adjacent to (in contact with) the oil pan 10. The third sealing member 230a adheres tightly to the outer peripheral surface of the drive shaft 7.

The action of the first sealing member 210a, the second sealing member 220a, and the third sealing member 230a of the outboard motor 1 according to the present preferred embodiment is now described.

Figure 4:
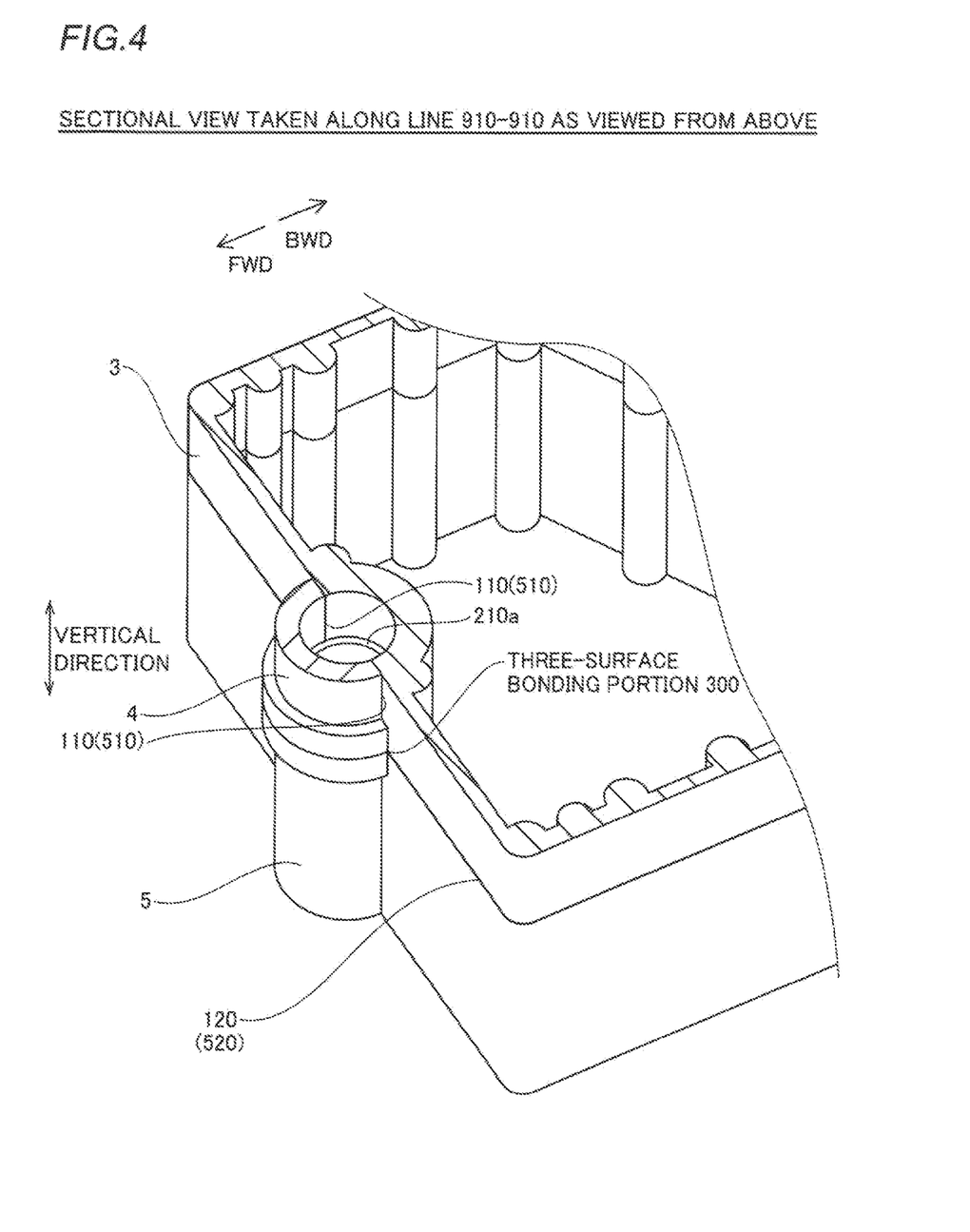
FIG. 4 is a sectional view taken along the line 910-910 in FIG. 2, as viewed from above.

In a portion 300 (hereinafter referred to as the three-surface bonding portion 300) where boundary surfaces between the cylinder body 3, the crank case 4, and the engine holder 5 intersect with each other, as shown in FIG. 4, a very small clearance remains. When external water (seawater or freshwater) enters from between the engine holder 5 and the crank case 4, it enters a portion (see FIG. 3) between the first sealing member 210a and the second sealing member 220a through the three-surface bonding portion 300. In other words, the portion between the first sealing member 210a and the second sealing member 220a is an external water entering region that external water enters, as shown in FIG. 3. Even in the case where external water enters this external water entering region, the first sealing member 210a prevents entry of external water into portions of the crank shaft 6 and the drive shaft 7 above the first sealing member 210a. Furthermore, the second sealing member 220a prevents entry of external water into portions of the crank shaft 6 and the drive shaft 7 below the second sealing member 220a. In other words, oil regions (regions that no external water enters) above the first sealing member 210a and an external water entering region below the first sealing member 210a are separated by the first sealing member 210a. Furthermore, oil regions below the second sealing member 220a and an external water entering region above the second sealing member 220a are separated by the second sealing member 220a.

In addition, the third sealing member 230a prevents entry of external water into a portion (a portion filled with oil of the oil pan 10) of the drive shaft 7 above the third sealing member 230a. In other words, oil regions above the third sealing member 230a provided between the third sealing member 230a and the second sealing member 220a, and external water entering regions below the third sealing member 230a are separated by the third sealing member 230a.

As described above, the first sealing member 210a is configured such that the oil regions above the first sealing member 210a are used as a path (oil return path) through which oil returns from the engine 2 to the oil pan 10. The first sealing member 210a, the second sealing member 220a, and the third sealing member 230a are configured such that the sectional area of the oil return path is increased. Consequently, the collection efficiency of oil collected by the oil pan 10 is improved.

According to the preferred embodiments described above, the following effects are obtained.

According to a preferred embodiment of the present invention, the outboard motor 1 is provided with the first sealing member 210a between the portions of the crank shaft 6 and the drive shaft 7 above the second bonding surface 520 and above both the cylinder body 3 and the crank case 4. The first sealing member 210a is configured to separate the oil regions above the first sealing member 210a and the external water entering region below the first sealing member 210a. Thus, even in the case where external water entering from between the engine holder 5 and the crank case 4 enters a portion (in the holes 2a) where the crank shaft 6 is arranged through the three-surface bonding portion 300, the first sealing member 210a prevents exposure of inner portions of the cylinder body 3 and the crank case 4 to external water (entry of external water into the oil regions of the cylinder body 3 and the crank case 4). Consequently, the number of components requiring surface treatment in the cylinder body 3 and the crank case 4 is reduced. Therefore, the number of components requiring water resistant surface treatment is reduced while exposure of the inner portions of the cylinder body 3 and the crank case 4 to external water is prevented.

According to a preferred embodiment of the present invention, the outboard motor 1 is provided with the second sealing member 220a between the portions of the crank shaft 6 and the drive shaft 7 and below the second bonding surface 520 and the engine holder 5. Thus, the second sealing member 220a prevents entry of external water from the external water entering region above the second sealing member 220a into the regions below the second sealing member 220a. Therefore, the number of components requiring water resistant surface treatment is further reduced while exposure of the components coupled to the crank shaft 6 and the drive shaft 7 in the regions below the second sealing member 220a to external water is prevented.

According to a preferred embodiment of the present invention, the outboard motor 1 is configured such that no external water enters the portions of the crank shaft 6 and the drive shaft 7 above the first sealing member 210a and the portions of the crank shaft 6 and the drive shaft 7 below the second sealing member 220a. Thus, entry of external water into the portions where the crank shaft 6 and the drive shaft 7 are located is prevented. Furthermore, water resistant surface treatment is performed only on the portion held between the first sealing member 210a and the second sealing member 220a, and hence the number of components requiring water resistant surface treatment is further reduced.

According to a preferred embodiment of the present invention, the first sealing member 210a and the second sealing member 220a are provided in the outer peripheral portion of the lower portion of the crank shaft 6. Thus, entry of external water into an upper portion of the crank shaft 6 is prevented. Consequently, surface treatment on the upper portion of the crank shaft 6 is not required, or water resistant surface treatment on a larger number of components is not required.

According to a preferred embodiment of the present invention, the first sealing member 210a and the second sealing member 220a preferably include ring-shaped sealing members. Thus, the first sealing member 210a and the second sealing member 220a adhere tightly to the complete peripheries of the outer peripheral portions of the crank shaft 6 and the drive shaft 7.

According to a preferred embodiment of the present invention, the first sealing member 210a and the second sealing member 220a are preferably ring-shaped oil seals. Thus, the first sealing member 210a and the second sealing member 220a have a high sealing performance.

According to a preferred embodiment of the present invention, the first sealing member 210a and the second sealing member 220a are opposed to each other in the vertical direction. Thus, the first sealing member 210a and the second sealing member 220a are located close to each other. Therefore, the external water entering region between the first sealing member 210a and the second sealing member 220a is reduced in size. Consequently, the first sealing member 210a and the second sealing member 220a are prevented from being moved and displaced from their positions.

According to a preferred embodiment of the present invention, the crank case 4 and the cylinder body 3 include the first storage portion 210 accommodating the first sealing member 210a. Thus, the first sealing member 210a is securely accommodated (held) in the first storage portion 210.

According to a preferred embodiment of the present invention, the engine holder 5 includes the second storage portion 220 accommodating the second sealing member 220a. Thus, the second sealing member 220a is securely accommodated (held) in the second storage portion 220.

According to a preferred embodiment of the present invention, the third sealing member 230a is located below the second sealing member 220a and separates the oil regions above the third sealing member 230a, provided between the third sealing member 230a and the second sealing member 220a, and the external water entering regions below the third sealing member 230a. Furthermore, the oil pump 11 is provided in the oil region between the second sealing member 220a and the third sealing member 230a. Thus, the region between the second sealing member 220a and the third sealing member 230a is reliably an oil region, and the oil pump 11 is located in the oil region. Consequently, the degree of freedom of the layout of a lubricating system is improved.

According to a preferred embodiment of the present invention, the first gasket 110 is arranged on the first bonding surface 510 between the cylinder body 3 and the crank case 4. Thus, entry of external water into the holes 2a through the first bonding surface 510 is prevented.

According to a preferred embodiment of the present invention, the second gasket 120 is located on the second bonding surface 520 between both the crank case 4 and the cylinder body 3 and the engine holder 5. Thus, entry of external water into the regions of the crank shaft 6 and the drive shaft 7 through the second bonding surface 520 is prevented. Furthermore, unlike the case where the same is sealed by a liquid gasket (a gasket containing flowable hardening resin), for example, the second bonding surface 520 is sealed by the metal gasket (second gasket 120), such that sealing is easily performed also when the engine 2 (the cylinder body 3, the crank case 4) and the engine holder 5 separated from each other for maintenance or the like are combined again.

According to a preferred embodiment of the present invention, the crank shaft 6 and the drive shaft 7 are coaxial with each other. Thus, the shapes of the crank shaft 6 and the drive shaft 7 are prevented from being complicated.

According to a preferred embodiment of the present invention, the axis line A1 of the drive shaft 7 extends along the extension surface of the first bonding surface 510. Thus, peripheral wall portions defining the holes 2a into which the crank shaft 6 and the drive shaft 7 are inserted are divided in half into the cylinder body 3 and the crank case 4. Consequently, the first bonding surface 510 of the holes 2a (the cylinder body 3, the crank case 4) where the crank shaft 6 and the drive shaft 7 are located is easily sealed.

The preferred embodiments described above are to be considered as illustrative in all points and not restrictive. The range of the present invention is shown not by the above description of the preferred embodiments but by the scope of claims for patent, and all modifications within the meaning and range equivalent to the scope of claims for patent are further included.

For example, while the first sealing member 210a, the second sealing member 220a, and the third sealing member 230a are preferably provided in the above preferred embodiments, the present invention is not restricted to this. According to another preferred embodiment of the present invention, the second sealing member and the third sealing member may not be provided if the power transmission shaft does not pass through the oil pan (oil region).

While external water enters the portion between the first sealing member 210a and the second sealing member 220a in the above preferred embodiments, the present invention is not restricted to this. According to another preferred embodiment of the present invention, external water may not enter the portion between the first sealing member and the second sealing member.

While the first sealing member 210a, the second sealing member 220a, and the third sealing member 230a are preferably the ring-shaped oil seals in the above preferred embodiments, the present invention is not restricted to this. According to another preferred embodiment of the present invention, the first sealing member, the second sealing member, and the third sealing member may alternatively be seal members other than the ring-shaped oil seals.

While the oil pump 11 is preferably located in the oil region between the second sealing member 220a and the third sealing member 230a in the above preferred embodiments, the present invention is not restricted to this. According to another preferred embodiment of the present invention, the oil pump may alternatively be arranged in an oil region other than the oil region between the second sealing member and the third sealing member.

While the first gasket 110 and the second gasket 120 are preferably provided in the above preferred embodiments, the present invention is not restricted to this. According to another preferred embodiment of the present invention, only one of the first gasket and the second gasket may alternatively be provided. Alternatively, neither the first gasket nor the second gasket may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a cylinder body and a crank case adjacent to the cylinder body in a horizontal direction and bonded to the cylinder body along a first bonding surface;
   an engine holder configured to come into contact with both the cylinder body and the crank case along a second bonding surface, and including an upper surface to which the engine is fixed;
   a power transmission shaft including a crank shaft rotatably supported between the cylinder body and the crank case and including a drive shaft coupled to the crank shaft and configured to pass through a hole between the cylinder body, the crank case, and the engine holder in a direction intersecting with the second bonding surface; and
   a first sealing member between a portion of the power transmission shaft above the second bonding surface and above both the cylinder body and the crank case, and configured to separate an oil region above the first sealing member from an external water entering region below the first sealing member.

2. The outboard motor according to claim 1, further comprising a second sealing member between the engine holder and a portion of the power transmission shaft below the second bonding surface.

3. The outboard motor according to claim 2, wherein a portion between the first sealing member and the second sealing member is the external water entering region that external water enters, and
   no external water enters a portion of the power transmission shaft above the first sealing member or a portion of the power transmission shaft below the second sealing member.

4. The outboard motor according to claim 2, wherein the first sealing member and the second sealing member are located at an outer peripheral portion of a lower portion of the crank shaft.

5. The outboard motor according to claim 2, wherein each of the first sealing member and the second sealing member includes a ring-shaped sealing member.

6. The outboard motor according to claim 5, wherein each of the first sealing member and the second sealing member includes a ring-shaped oil seal.

7. The outboard motor according to claim 5, wherein the first sealing member and the second sealing member are opposed to each other in a vertical direction.

8. The outboard motor according to claim 5, wherein the crank case and the cylinder body include an annular first storage portion accommodating the first sealing member.

9. The outboard motor according to claim 8, wherein the engine holder includes an annular second storage portion provided below the first storage portion and accommodating the second sealing member.

10. The outboard motor according to claim 2, further comprising:
    an oil pump configured to circulate oil to the engine; and
    a third sealing member below the second sealing member, configured to separate an oil region above the third sealing member, and provided between the third sealing member, the second sealing member, and an external water entering region below the third sealing member; wherein
    the oil pump is located in the oil region between the second sealing member and the third sealing member.

11. The outboard motor according to claim 1, further comprising a first gasket on the first bonding surface between the cylinder body and the crank case.

12. The outboard motor according to claim 1, further comprising a second gasket on the second bonding surface between engine holder and both the crank case and the cylinder body.

13. The outboard motor according to claim 1, wherein the crank shaft and the drive shaft are coaxial with each other.

14. The outboard motor according to claim 1, wherein a rotation central axis line of the drive shaft extends along on an extension surface of the first bonding surface.

* * * * *